United States Patent Office 3,311,586
Patented Mar. 28, 1967

---

3,311,586
ESTERS OF DIBASIC BICYCLIC ACIDS AND USE AS PLASTICIZERS
John F. Olin, Ballwin, Mo., assignor to Monsanto Company, St. Louis, Mo., a corporation of Delaware
No Drawing. Original application Nov. 20, 1959, Ser. No. 854,260. Divided and this application July 15, 1963, Ser. No. 295,200
6 Claims. (Cl. 260—30.4)

This is a divisional application of my copending application, Ser. No. 854,260, filed Nov. 20, 1959 and now abandoned.

This invention relates to esters of dibasic bicyclic hydroxy and keto acids. In one aspect, this invention relates to esters of 9-oxo-3-oxabicyclo[3.3.1]nonane-1,5-dicarboxylic acid and 9-hydroxy-3-oxabicyclo[3.3.1]nonane-1,5-dicarboxylic acid as new compounds and methods for producing the same. In another aspect, this invention relates to polyvinyl halide resin compositions containing a plasticizing amount of an ester of 9-oxo-3-oxabicyclo[3.3.1]nonane-1,5-dicarboxylic acid or 9-hydroxy-3-oxabicyclo[3.3.1]nonane-1,5-dicarboxylic acid and methods for producing the same.

The preparation of the dibasic hydroxy acid, 9-hydroxy-3-oxabicyclo[3.3.1]nonane-1,5-dicarboxylic acid, and the dibasic keto acid, 9-oxo-oxabicyclo[3.3.1]nonane-1,5-dicarboxylic acid, which can be represented by the formulas

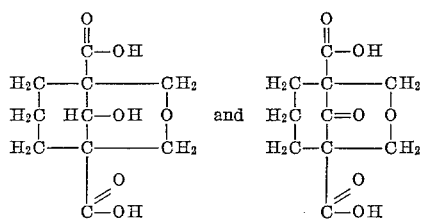

respectively, is disclosed in my copending application Ser. No. 854,265, filed November 20, 1959 and now abandoned. These acids can be considered to be derivatives of β-hydroxy and β-keto glutaric acids which are known to be relatively unstable under esterification conditions and are therefore not readily formed into esters.

An object of this invention is to provide a process for esterifying 9-hydroxy- and 9-oxo-3-oxabicyclo[3.3.1]nonane-1,5-dicarboxylic acids without cleaving the ether linkage of said acids.

Another object of this invention is to provide a process for esterifying 9-hydroxy- and 9-oxo-3-oxabicyclo[3.3.1]nonane-1,5-dicarboxylic acids without decarboxylation of the carbonyl group of said acids.

Another object of this invention is to provide a process for producing esters of 9-hydroxy- and 9-oxo-3-oxabicyclo[3.3.1]nonane-1,5-dicarboxylic acids by esterification with primary or secondary alcohols.

Another object of this invention is to provide esters of 9-hydroxy- and 9-oxo-3-oxabicyclo[3.3.1]nonane-1,5-dicarboxylic acids as new compounds.

Another object of this invention is to provide methods for plasticizing polyvinyl halide resins by incorporating therewith a plasticizing amount of an ester of 9-hydroxy-3-oxabicyclo[3.3.1]nonane-1,5-dicarboxylic acid or 9-oxo-3-oxabicyclo[3.3.1]nonane-1,5-dicarboxylic acid.

Other objects and advantages of this invention will be apparent to one skilled in the art upon studying this disclosure.

In accordance with this invention, 9-hydroxy-3-oxabicyclo[3.3.1]nonane-1,5-dicarboxylic acid or 9-oxo-3-oxabicyclo[3.3.1]nonane-1,5-dicarboxylic acid is esterified under esterification conditions with a primary or secondary alcohol to form an ester of said 9-hydroxy-3-oxabicyclo[3.3.1]nonane-1,5-dicarboxylic acid or 9-oxo-3-oxabicyclo[3.3.1]nonane-1,5-dicarboxylic acid, as illustrated by the following equation

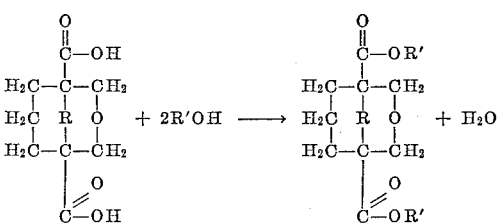

wherein R is selected from the group consisting of carbonyl and hydroxymethylidyne radicals and R′ is selected from the group consisting of alkyl, cycloalkyl, (alkyl)cycloalkyl, and aralkyl radicals. In conducting the esterification, an acid catalyst is used and the reaction is conducted in the presence of a hydrocarbon entrainer to effect removal of the water formed in the reaction. Preferably, the esterification effluent is neutralized with a weak alkaline solution to effect removal of the acid catalyst and any partially esterified products. The ester is recovered from the neutralized esterification effluent by any of the methods known to those skilled in the art, such as, filtration, decantation, distillation, and the like.

Further, in accordance with the present invention, there are provided, as new compounds, esters of the formula

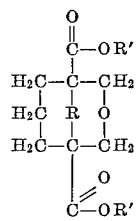

wherein R is selected from the group consisting of carbonyl and hydroxymethylidyne radicals and R′ is selected from the group consisting of alkyl, cycloalkyl, (alkyl)cycloalkyl, and aralkyl radicals. In the above formula, where R is a carbonyl radical, the new compound is an ester of 9-oxo-3-oxabicyclo[3.3.1]nonane-1,5-dicarboxylic acid and where R is a hydroxymethylidyne radical, the new compound is an ester of 9-hydroxy-3-oxabicyclo[3.3.1]nonane-1,5-dicarboxylic acid.

Further, in accordance with the present invention, there is provided a method for plasticizing polyvinyl halide resins by incorporating with said resins a plasticizing amount of an ester of the formula

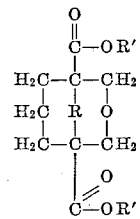

wherein R is selected from the group consisting of carbonyl and hydroxymethylidyne radicals and R′ is selected from the group consisting of alkyl, cycloalkyl, (alkyl)cycloalkyl, and aralkyl radicals.

Further, in accordance with the present invention, there are provided improved polyvinyl halide resin compositions comprising polyvinyl halide resin and a plasticizing amount of an ester of the formula

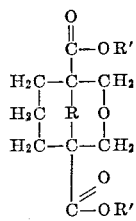

wherein R is selected from the group consisting of carbonyl and hydroxymethylidyne radicals and R' is selected from the group consisting of alkyl, cycloalkyl, (alkyl)cycloalkyl, and aralkyl radicals.

The 9-hydroxy- and 9-oxo-3-oxabicyclo[3.3.1]nonane-1,5-dicarboxylic acid reactants employed in the esterification process of this invention are preferably those dibasic acids obtained in the process disclosed in my copending application Ser. No. 854,265, filed Nov. 20, 1959. However, dibasic acids produced by other methods can also be used in the process of this invention.

The alcohol reactant employed in the esterification process of this invention is a primary or secondary alcohol; i.e., an alcohol having at least 1 hydrogen atom attached to the carbon atom to which the hydroxy group is attached. Thus, alkyl, cycloalkyl, (alkyl)cycloalkyl, and aralkyl alcohols can be utilized in the process of this invention to esterify the dibasic hydroxy- and keto-acids. This invention is not limited by the number of carbon atoms in the molecule of the alcohol reactant and alcohols having any number of carbon atoms can be used; however, preferably, alcohols having fewer than 18 carbon atoms are employed. Mixtures of these alcohols can also be used as the alcohol reactant in this invention.

Illustrative examples of some primary and secondary alcohols, including those having straight as well as branched-chain radicals, which can be employed in the reaction of this invention are: methanol; ethanol; 1- and 2-propanol; 1- and 2-butanol; 1- and 2-pentanol; 1-octanol; 2-ethyl-1-hexanol; 1-decanol; 1-dodecanol; 1-octadecanol; 2 - methylcyclohexanol; 3 - methylcyclohexanol; 3,3-dimethylcyclohexanol; 2-ethylcyclohexanol; 3,3,5-trimethylcyclohexanol; 2-propylcyclohexanol; 2-hexylcyclohexanol; 1-methylcyclohexylmethanol; 1-ethylcyclohexylmethanol; 1-butylcyclohexylmethanol; 1-(1'-methylcyclohexyl) - 1 - ethanol; 1 - (1' - methylcyclohexyl)-2-ethanol; 1-(2'-methylcyclohexyl) - 1 - ethanol; 1-(1'-ethylcyclohexyl)-1-propanol; 1-(2'-ethylcyclohexyl)-3-propanol; 1-(1'-methyl-2'-methylcyclohexyl)-1-ethanol; 1-(3'-methylcyclohexyl)-1-pentanol; 1-(1'-methylcyclohexyl)-6-hexanol; 1-(1'-hexylcyclohexyl)-1-butanol; benzyl alcohol; 2-phenol-1-ethanol; 1-phenol-1-ethanol; 3-phenol-1-propanol; 1-phenol-1-decanol; 8-phenol-1-octanol; 2-methylbenzyl alcohol; 3-methylbenzyl alcohol; 4-methylbenzyl alcohol; 2,3-dimethylbenzyl alcohol; and 2,4-dimethylbenzyl alcohol.

Although the esterification process of this invention can be carried out in the absence of a catalytic agent, the use of a catalyst is generally beneficial and, preferably, a catalyst is used. Suitable catalysts include sulfuric acid, alkanesulfonic acids, and arylsulfonic acids. The sulfuric acid catalyst can be of any concentration although it is preferred to use a concentrated acid since the excess water in a dilute acid will otherwise have to be removed azeotropically in the esterification process. The alkanesulfonic acid catalysts are preferably the lower alkanesulfonic acids containing from 1 to 12 carbon atoms, such as methanesulfonic acid, ethanesulfonic acid, propanesulfonic acid, and butanesulfonic acid. If desired, a mixture of lower alkanesulfonic acids can be used and such a mixture containing methane, ethane, and propanesulfonic acids is commercially available. Ordinarily, the alkanesulfonic acid will comprise from 92% to 95% sulfonic acid, from 1 to 2% sulfuric acid, and from 3 to 6% water. The arylsulfonic acid catalysts which can be used in the process of this invention include the benzenesulfonic acids, toluenesulfonic acids, and chlorobenzenesulfonic acids, with p-toluenesulfonic acid and 4-chlorobenzenesulfonic acid being preferred.

A hydrocarbon entrainer or azeotrope former is used in the process of this invention to facilitate the removal of the water formed in the esterification step. In general, the hydrocarbon entrainer can be any organic compound which forms an azeotrope with water, said azeotrope having a boiling point in the range from 75° C. to 100° C., and in which the dibasic acid reactants and alcohol reactants as well as the ester products are substantially soluble. Preferably, the hydrocarbon entrainer is an aromatic hydrocarbon which may also be an alkylated aromatic hydrocarbon provided there are not more than a total of 4 carbon atoms in the alkyl groups attached to the benzene ring. Examples of suitable aromatic hydrocarbon entrainers include: toluene; o-, m-, and p-xylene; ethylbenzene; n-propylbenzene; cumene; 1,2,3 - trimethylbenzene; 1,2,4 - trimethylbenzene; 1,2,4,5-tetramethylbenzene; and butylbenzene. In addition, paraffinic hydrocarbons, preferably those paraffin hydrocarbons containing from 6 to 9 carbon atoms, can be used as hydrocarbon entrainers. Also, chlorinated derivatives of the above aromatic and paraffinic hydrocarbon entrainers can be employed if desired.

The esterification reaction is carried out at a temperature corresponding to the azeotropic distillation temperature of the hydrocarbon entrainer and the water produced in the esterification step. Ordinarily, the reaction temperature will be within the range of from 75° C. to 175° C., depending to some extent upon the nature of the hydrocarbon entrainer, the quantity of hydrocarbon entrainer used, and the boiling point of the alcohol reactant. Preferably, a temperature in the upper part of the temperature range is used in order to be able to conduct the reaction in a relatively short time; however, temperatures in the lower portion of the range can be used effectively by maintaining reaction conditions for a longer period of time, usually in excess of 2 hours.

The esterification reaction of this invention is preferably carried out at substantially atmospheric pressure.

The amount of catalyst present in the reaction zone can be varied over wide limits as determined by the temperature to be used and the reaction time desired. At higher temperature, the amount of catalyst required in the reaction zone is smaller than when lower temperatures are used. Ordinarily, the amount of catalyst used will be between 1 and 8% by weight of the amount of the dibasic acid reactants.

The amount of hydrocarbon entrainer present in the reaction zone can be varied over wide limits, preferably within the range of from 25% to 200% by weight of the amount of the dibasic acid reactant.

Ordinarily, stoichiometric amounts of the alcohol reactant and the dibasic acid reactant are maintained in the reaction zone; that is, 2 moles of the alcohol reactant for each mole of the dibasic acid reactant. If desired, the alcohol reactant can be present in the reaction zone in excess of the stoichiometric amount and the excess alcohol recovered in the separation step. Preferably, an excess of the dibasic acid reactant is not used in order to avoid the excessive formation of side-products.

Following completion of the esterification step, as determined by the evolution of water from the reaction zone, the reaction effluent is neutralized with a dilute alkaline solution in order to remove the last traces of the catalyst and partially esterified products. Any weak alkaline solution can be used for this purpose, including sodium carbonate, potassium carbonate, and dilute sodium hydroxide or calcium hydroxide.

The present ester products are stable, high-boiling compounds which range from clear, viscous liquids to waxy solids depending upon the number of carbon atoms in the alcohol reactants. Thus, the ester of the methyl alcohol and 9-oxo-3-oxabicyclo[3.3.1]nonane-1,5-dicarbonylic acid is a solid material whereas the decyl ester of the same acid is a pale straw colored liquid having a boiling point at 0.2 mm. of 258–262° C. In general, the present esters are soluble in organic compounds and relatively insoluble in water.

Illustrative examples of some of the esters of 9-hydroxy-3-oxabicyclo[3.3.1]nonane-1,5-dicarboxylic acid include the following:

bis(methyl)-9-hydroxy-3-oxabicyclo[3.3.1]nonane-1,5-dicarboxylate
bis(butyl)-9-hydroxy-3-oxabicyclo[3.3.1]nonane-1,5-dicarboxylate
bis(dodecyl)-9-hydroxy-3-oxabicyclo[3.3.1]nonane-1,5-dicarboxylate
bis(cyclohexyl)-9-hydroxy-3-oxabicyclo[3.3.1]nonane-1,5-dicarboxylate
bis(2-ethylcyclohexyl)-9-hydroxy-3-oxabicyclo[3.3.1]nonane-1,5-dicarboxylate
bis(1-ethylcyclohexylmethyl)-9-hydroxy-3-oxabicyclo[3.3.1]-nonane-1,5-dicarboxylate
bis(benzyl)-9-hydroxy-3-oxabicyclo[3.3.1]nonane-1,5-dicarboxylate
bis(3-methylbenzyl)-9-hydroxy-3-oxabicyclo[3.3.1]nonane-1,5-dicarboxylate
bis(2,3-dimethylbenzyl)-9-hydroxy-3-oxabicyclo[3.3.1]nonane-1,5-dicarboxylate Illustrative examples of some of the esters of 9-oxo-3-oxabicyclo[3.3.1]nonane-1,5-dicarboxylate acid include the following:

bis(methyl)-9-oxo-3-oxabicyclo[3.3.1]nonane-1,5-dicarboxylate
bis(butyl)-9-oxo-3-oxabicyclo[3.3.1]nonane-1,5-dicarboxylate
bis(2-ethyl-1-hexyl)-9-oxo-3-oxabicyclo[3.3.1]nonane-1,5-dicarboxylate
bis(1-decyl)-9-oxo-3-oxabicyclo[3.3.1]nonane-1,5-dicarboxylate
bis(cyclohexyl)-9-oxo-3-oxabicyclo[3.3.1]nonane-1,5-dicarboxylate
bis(2-methylcyclohexyl)-9-oxo-3-oxabicyclo[3.3.1]nonane-1,5-dicarboxylate
bis(3,3,5-trimethyl)-9-oxo-3-oxabicyclo[3.3.1]nonane-1,5-dicarboxylate
bis(1-methylcyclohexylmethyl)-9-oxo-3-oxabicyclo[3.3.1]nonane-1,5-dicarboxylate
bis(1-butylcyclohexylmethyl)-9-oxo-3-oxabicyclo[3.3.1]nonane-1,5-dicarboxylate
bis(2-phenyl-1-ethyl)-9-oxo-3-oxabicyclo[3.3.1]nonane-1,5-dicarboxylate The esters of the dibasic hydroxy and keto acids of this invention are advantageously used for a variety of industrial purposes as well as intermediates in the formation of other chemical compounds. The liquid esters are characterized by having low volatility and a good temperature stability, thereby finding use as functional fluids in hydraulic fluid systems as well as vacuum pump systems. Furthermore, the esters of this invention find extensive use as plasticizers for various synthetic resins, particularly the polyvinyl halide resins such as polyvinyl chloride to form softened compositions of increased resiliency and flexibility which is retained at low temperatures as well as at higher temperatures.

As plasticizers, the esters of the invention are fully compatible with vinyl halide resins as is apparent by visual inspection of the plasticized composition. Furthermore, the esters of this invention produce flexible polyvinyl halide compositions at room temperature as well as at lower temperatures where many plasticized polyvinyl halide compositions become very brittle and useless. In addition, the plasticized polyvinyl halide compositions of this invention do not become brittle and useless with age or upon heating because the esters have very low volatility and are relatively insoluble in water. The solid esters of this invention can also be used as plasticizers in compositions where a solid plasticizer is desirable, such as in heat sensitive adhesive compositions.

The advantages, desirability and usefulness of the present process in the esterification of dibasic hydroxy and keto acids to form esters thereof, and use in polyvinyl halide compositions are well illustrated by the following examples.

*Example 1*

The butyl ester of the dibasic keto acid was prepared by reacting 114 g. (0.5 moles) of 9-oxo-3-oxabicyclo-[3.3.1]nonane-1,5-dicarboxylic acid with 111 g. (1.5 moles) of n-butyl alcohol. These reactants, together with 100 g. of benzene as a hydrocarbon entrainer and 1.0 g. of sulfuric acid as a catalyst, were placed in a 3-neck flask and refluxed under a water trap with stirring for a period of 18 hours at a temperature of from 90° to 95° C. Upon completion of the esterification, as determined by the amount of water collected in the water trap, the reaction effluent was allowed to cool to 80° C. and was then neutralized with a potassium carbonate solution containing 5 g. of $K_2CO_3$ in 300 g. of water. Thereafter, the neutralized reaction effluent was washed twice with water and distilled at a pressure of 0.5 mm. Hg to recover 161 g. of bis(butyl) - 9 - oxo - 3 - oxabicyclo[3.3.1]nonane - 1,5-dicarboxylate boiling at 155–160° C./0.5 mm. This ester was a colorless oil having a boiling point of 195° C. at 0.3 mm. pressure. Analysis of the compound gave 63.29% carbon and 8.3% hydrogen as compared with a calculated value of 63.58% carbon and 8.06% hydrogen.

*Example 2*

In this example, the 1-methylcyclohexylmethyl ester of the dibasic keto acid was prepared by esterifying 114 g. (0.5 moles) of 9-oxo-3-oxabicyclo[3.3.1]nonane-1,5-dicarboxylic acid with 140.8 g. (1.1 mole) of 1-methylcyclohexylmethanol using 0.5 ml. of sulfuric acid as a catalyst and 100 ml. of benzene as a hydrocarbon entrainer. The esterification was conducted at a temperature of from 95° C. to 103° C. for a period of 24 hours using a water trap to collect the 18 ml. of water split out in the esterification period. Thereafter, the reaction effluent was cooled and diluted with 100 ml. of hexane before being neutralized with a 2% solution of potassium carbonate and being washed twice with water. This material was then distilled at a pressure of 0.5 mm. to recover an extremely viscous, pale straw liquid boiling in the range of 230–235° C. Upon redistillation, this fraction yielded 188 g. of bis(1-methylcyclohexylmethyl)-9-oxo-3-oxabicyclo[3.3.1]-nonane-1,5-dicarboxylate which is a very viscous, colorless liquid having a boiling point of 230–235° C. at 0.2 mm. pressure.

*Example 3*

In this example, the 2-ethylhexyl ester of 9-oxo-3-oxabicyclo[3.3.1]nonane-1,5-dicarboxylic acid was prepared from 114 g. (0.5 moles) of the dibasic keto acid and 150 g. of 2-ethyl hexanol using 125 ml. of benzene as a hydrocarbon entrainer and 1 ml. of concentrated sulfuric acid as a catalyst. These materials were mixed together and refluxed under a water trap at a temperature of 95–100° C. for a period of 24 hours, at which time the theoretical amount of water had been evolved. The reaction effluent was then washed twice with a dilute potassium carbonate solution and then with water. The neutralized reaction effluent was then distilled at a pot temperature of 150° C. and a pressure of 20 mm. Hg using a water aspirator. After removal of volatile matter, the residue from this first distillation was then distilled under high vacuum at a pressure of 0.5 mm. for recovery of a straw colored oil boiling at 215–220° C. Redistillation of this fraction gave 186 g. of bis(2-ethylhexyl)-9-oxo-3-oxabicyclo-

[3.3.1]nonane-1,5-dicarboxylate which was water white in appearance and had a boiling point of 235–7° C. at 0.2 mm. pressure. An analysis of this product gave 68.94% carbon and 9.8% hydrogen as compared with calculated values of 69.03% carbon and 10.14% hydrogen.

*Example 4*

In this example, the decyl ester of the dibasic keto acid was prepared by esterification of 148 g. (0.65 moles) of 9 - oxo - 3 - oxabicyclo[3.3.1]nonane - 1,5 - dicarboxylic acid with 237 g. (1.5 moles) of "primary decyl alcohol" employing 150 g. of benzene as a hydrocarbon entrainer and 1.5 ml. of methanesulfonic acid as a catalyst. These materials were refluxed together for a period of 24 hours at a temperature of 100° C. to recover 23 ml. of water in the water trap. After cooling, the reaction mass was washed with dilute potassium carbonate solution, followed by washing with water, and then distilled at a pressure of 0.5 mm. Hg to obtain 310 g. of bis(decyl)-9-oxo-3-oxabicyclo[3.3.1]nonane-1,5-dicarboxylate which is a pale straw colored oil having a boiling point of 258–262° C. at 0.5 mm. Hg.

*Example 5*

In this example, the butyl ester of the dibasic hydroxy acid was prepared by reacting 81 g. of 9-hydroxy-3-oxabicyclo[3.3.1]nonane-1,5-dicarboxylic acid with 100 g. of n-butanol using 60 g. of benzene as a hydrocarbon entrainer and 1 ml. of methanesulfonic acid as a catalyst. These materials were refluxed for a period of 24 hours, at which time an additional 1 ml. of methanesulfonic acid was added and the heating continued for an additional 24 hours with the recovery of 13 ml. of water in the water trap. After cooling, the reaction effluent was washed with a dilute potassium carbonate solution, followed by washing with water, and then distilled to remove the hydrocarbon entrainer and other volatile materials. Upon removal of the solvent, the ester formed as a crystalline precipitate in the distillation flask. After removal of the volatile matter, chlorobenzene was added to the distillation flask and the product decolorized using charcoal. The chlorobenzene was then removed by distillation and the residue dissolved in 150 ml. of isopropanol. While still hot, 400 ml. of heptane was added and the solution permitted to cool. Upon cooling, the bis(butyl)-9-hydroxy-3-oxabicyclo[3.3.1]nonane - 1,5-dicarboxylate formed as colorless leaflets. The ester was recovered by filtration and dried to yield a product in an amount of 102 g. This product had a melting point of 90–90.3° C. and a sulfonification equivalent of 174.1 as compared with a calculated value of 171.

*Example 6*

In this example, the isooctyl ester of the dibasic keto acid was prepared by esterification of the dibasic keto acid with 650 g. (5 moles) of "isooctyl alcohol" using 300 g. of benzene as a hydrocarbon entrainer and 5 ml. of methane-sulfonic acid as a catalyst. These materials, together with 5 g. of activated carbon, were refluxed at a temperature of approximately 100° C. for a period of 19 hours to collect 74 ml. of water in the water trap. The reaction effluent was filtered to remove the activated carbon and then neutralized with dilute potassium carbonate solution followed by washing with water. Thereafter, the neutralized material was distilled at a pressure of 0.15 mm. Hg to recover 685 g. of bis(isooctyl)-9-oxo-3-oxabicyclo[3.3.1]nonane-1,5-dicarboxylate boiling in the range of 215–240° C.

*Example 7*

In this example, the plasticizer properties of several of the esters of this invention were determined for use in polyvinyl chloride resins. These resin compositions comprised 60 parts of the polyvinyl chloride resin and 40 parts of the candidate plasticizer, including ¼ phr. of dibasic lead stearate as a heat stabilizer. These materials were mixed on a rolling mill to form a homogeneous blend. Visual inspection of the compositions indicated that all the candidate plasticizers were compatible with polyvinyl chloride. Molded sheets from all of the milled mixtures were clear and transparent. The low temperature flex point, volatility, water extraction, and kerosene extraction for each composition in the form of a molded sheet were determined and are reported in the table below:

|  | Low Temp. Flex., ° C. | Volatility | Water Extraction, Percent Sol. Matter Lost | Kerosene Ext., Percent Plasticizer Lost |
|---|---|---|---|---|
| Bis(butyl)-9-oxo-3-oxabicyclo[3.3.1]nonane-1,5-dicarboxylate | −12 | 12.0 | 0.20 | 2.1 |
| Bis(1-methylcyclohexyl-methyl)-9-oxo-3-oxabicyclo[3.3.1]nonane-1,5-dicarboxylate | +20 | 1.1 | 0.04 | 0.6 |
| Bis(2-ethylhexyl)-9-oxo-3-oxabicyclo[3.3.1]-nonane-1,5-dicarboxylate | −17.7 | 1.9 | 0.0 | 0.8 |
| Bis(isodecyl)-9-oxo-3-oxabicyclo[3.3.1]-nonane-1,5-dicarboxylate | −20.4 | 1.2 | 0.06 | 33.1 |
| Polyester | −17 | 1.2 | 0.25 | 1.6 |

In these tests, the low temperature flexibility was determined according to the Clash-Berg method wherein the torsional flexibility of the sample is determined at various temperatures. This value may be defined as the lower temperature limit for use of the plasticized composition as an elastomer. The volatility was determined according to the carbon absorption method of the Society of the Plastics Industry. The amount of water extraction and kerosene extraction was determined by immersion of a sample in distilled water and kerosene for a period of 24 hours, followed by a determination of the loss in weight of the sample.

The polyester plasticizer included in the above table is a commercial product and is included for comparison purposes. This polyester plasticizer is commercially known as Paraplex G–50, manufactured by the Rohm Haas Company of Philadelphia, Pennsylvania, and is identified as having a molecular weight of 2200, freezing point of 272° C., specific gravity at 25° C. of 1.08 and refractive index at 25° C. of 1.4660.

While the above examples show only compositions in which the ratio of plasticizer to polymer is 40:60, this ratio being employed in order to get comparable efficiencies, the ratio of ester to polyvinyl chloride may be varied over a wide range, depending upon the properties desired in the final product. For some purposes, a plasticizer content of, say, from only 2 to 5% will be desirable; however, usually a plasticizer content above 10% is used. The present esters are compatible with polyvinyl chloride over wide ranges of concentration and concentrations up to 50% of ester based on the total weight of the plasticizer composition yield desirable products.

The invention has been described particularly with reference to the use of the present esters as plasticizers for polyvinyl chloride, but these esters are also advantageously employed as plasticizers for copolymers of vinyl chloride, for example, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. Preferably, such copolymers have a vinyl chloride content of at least 70% by weight and up to 30% by weight of the copolymerizable monomer.

The plasticized polyvinyl halide compositions of the present invention have good thermal stability; however, it may be desirable for various purposes to include known stabilizers in the plasticized compositions. Inasmuch as the present esters are substantially unreactive with the commercially available heat and light stabilizers which are commonly employed with polyvinyl halide resins, the presence of such materials in the plasticized compositions does not impair the valuable properties of the esters.

The esters of this invention, either singularly or in combination, are incorporated with the polyvinyl halide resin to form a plasticized polyvinyl halide resin by either milling or by dissolving the resin and the plasticizer in a mutual solvent and allowing the solvent to evaporate, or by any other conventional technique. Colors, dyes, extenders, pigments and other compounding ingredients can be included in the plasticized polyvinyl halide if it is so desired.

Reasonable variation and modification of the invention as described are possible, the essence of which is that there have been provided (1) a process for esterifying 9-hydroxy- and 9-oxo-3-oxabicyclo[3.3.1]nonane-1,5 - dicarboxylic acids with primary and secondary alcohols to form esters thereof, (2) said esters as new compounds, (3) methods for plasticizing polyvinyl halide resins by incorporating therewith a plasticizing amount of said esters, and (4) plasticized polyvinyl halide compositions containing a plasticizing amount of said esters.

What is claimed is:

1. A resinous composition comprising a major amount of a copolymer of at least 70% by weight of vinyl chloride and up to 30% by weight of an unsaturated monomer copolymerizable therewith, said copolymer being plasticized with a plasticizing amount of an ester having the formula

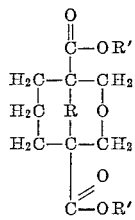

wherein R is selected from the group consisting of carbonyl and hydroxymethylidyne radicals and R' is selected from the group consisting of alkyl, cycloalkyl, (alkyl) cycloalkyl and aralkyl radicals.

2. A resinous composition comprising a major amount of a copolymer of at least 70% by weight of a vinyl chloride and not more than 30% by weight of an unsaturated monomer plasticized with a plasticizing amount of bis-(butyl)-9-oxo-3-oxabicyclo[3.3.1]nonane-1,5-dicarboxylate.

3. A resinous composition comprising a major amount of a copolymer of at least 70% by weight of a vinyl chloride and not more than 30% by weight of an unsaturated monomer plasticized with a plasticizing amount of bis - (1-methylcyclohexylmethyl)-9-oxo-3-oxabicyclo[3.3.1]nonane-1,5-dicarboxylate.

4. A resinous composition comprising a major amount of a copolymer of at least 70% by weight of a vinyl chloride and not more than 30% by weight of an unsaturated monomer plasticized with a plasticizing amount of bis-(2-ethylhexyl)-9-oxo-3-oxabicyclo[3.3.1]nonane - 1,5-dicarboxylate.

5. A resinous composition comprising a major amount of a copolymer of at least 70% by weight of a vinyl chloride and not more than 30% by weight of an unsaturated monomer plasticized with a plasticizing amount of bis-(isooctyl)-9-oxo-3-oxabicyclo[3.3.1]nonane-1,5-dicarboxylate.

6. A resinous composition comprising a major amount of a vinyl chloride polymer plasticized with a plasticizing amount of an ester having the formula

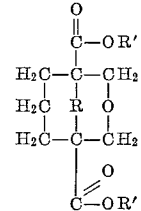

wherein R is selected from the group consisting of carbonyl and hydroxymethylidyne radicals and R' is selected from the group consisting of alkyl, cycloalkyl, (alkyl) cycloalkyl, and aralkyl radicals.

References Cited by the Examiner

Blomquist et al.: American Chemical Society Journal, vol. 79, pages 6025–6030 (1957).

Mannich et al.: Berichte Chemische, vol. 56 (April–June 1923), pages 835 and 839.

MORRIS LIEBMAN, *Primary Examiner.*

B. A. AMERNICK, *Assistant Examiner.*